BEST AVAILABLE COPY

May 10, 1949. W. S. TANDLER ET AL Re. 23,113

INSIDE SCANNING FACSIMILE MACHINE

Original Filed Feb. 25, 1944 3 Sheets-Sheet 1

INVENTOR.
William S. Tandler
David S. Walker

BY

Wm. Freeman

ATTORNEY.

BEST AVAILABLE COPY

May 10, 1949. W. S. TANDLER ET AL Re. 23,113

INSIDE SCANNING FACSIMILE MACHINE

Original Filed Feb. 25, 1944 3 Sheets-Sheet 2

INVENTORS
W. S. TANDLER
D. S. WALKER

BY

ATTORNEY

BEST AVAILABLE COPY

May 10, 1949. W. S. TANDLER ET AL Re. 23,113

INSIDE SCANNING FACSIMILE MACHINE

Original Filed Feb. 25, 1944 3 Sheets-Sheet 3

INVENTORS
W. S. TANDLER
D. S. WALKER

BY

ATTORNEY

Reissued May 10, 1949

BEST AVAILABLE COPY

Re. 23,113

UNITED STATES PATENT OFFICE 23,113

INSIDE SCANNING FACSIMILE MACHINE

William S. Tandler and David S. Walker, New York, N. Y., assignors, by mesne assignments, to The Western Union Telegraph Company, New York, N. Y., a corporation of New York Original No. 2,435,250, dated February 3, 1948, Serial No. 523,824, February 25, 1944. Application for reissue October 7, 1948, Serial No. 53,331

8 Claims. (Cl. 178—6.6)

Figure 1:
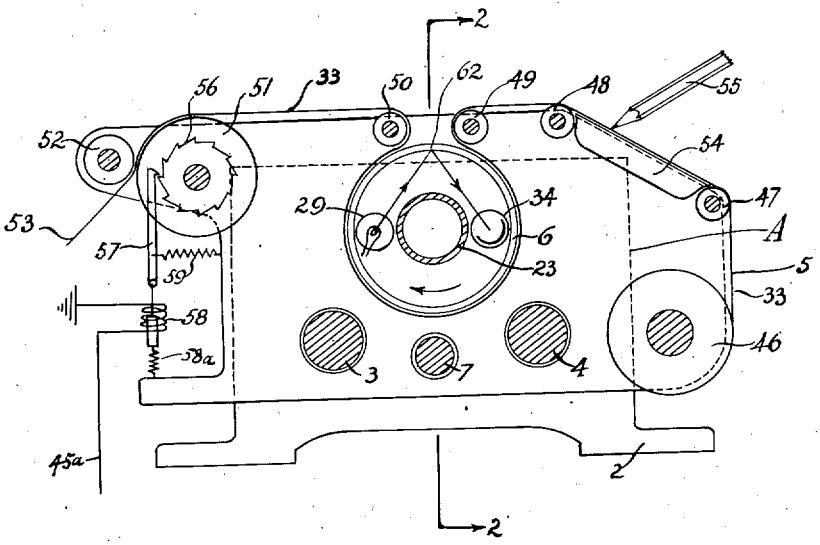

This invention relates to a facsimile system for the transmission of written messages.

The invention is particularly adapted to satisfy a requirement for which there exists a pronounced need and that is inter-office communication in writing.

Most inter-office communication systems are of sound or loud speaker type and they transmit only oral messages.

While the advantages of this system are apparent, because it permits communication between office members and employees without having to move from one room to another and without the requirement of a receiver, its drawbacks are quite numerous.

Loud speakers disturb the office work. If there is noise, they have to drown out this noise in order to be audible; they require immediate attention, interrupting the work. If the person to whom a message is addressed is not present, the message must be repeated at a later time, sometimes several times, and lines are kept busy with such incomplete calls. No permanent record exists.

Most messages transmitted by inter-office communication systems are short; very often they consist of figures only, such as orders, reports on stock available, blueprint numbers and the like. With a facsimile system these messages are transmitted in writing; the sender writes down the message and keeps a record of what he transmits; the receiving end obtains the message in writing, therefore, also has a permanent record available. Noises exert no influence on the transmitting procedure, on the other hand, no noise is produced; therefore, the office members and employees are not disturbed; the receiving party may be absent from his working place or desk and still obtain the message without the necessity of additional calls. If the receiving party is busy at the time when the message comes in, he or she need not interrupt the work in order to listen, but may wait until it is convenient, to read the message and, if necessary, transmit the answer.

While, in oral systems, the lack of a facility to transmit pictorial messages, such as sketches or drawings, is badly felt, the facsimile system permits telereproduction of sketches, drawings, marks and similar messages which is extremely helpful and time saving. Another great advantage resides therein that secrecy is preserved, while an oral message transmitter, such as a loud speaker is audible to everybody. This is particularly important when visitors or strangers are present or in offices where a certain secrecy is required, for instance, in doctors', lawyers', stockbrokers' offices.

Therefore, there is a great need and demand for a system permitting short distance and inter-office communication of written messages, and the savings in time, the elimination of misunderstandings and the annoyance caused by disturbance of other people and of long waiting periods, in case the party addressed is absent, are of great importance.

However, this type of an interoffice communication system will comply with all requirements and be practically useful only if it is simple, sturdy, fast-working, inexpensive, reliable and practical.

While there is a great number of systems available that might serve the aforesaid purpose, it may well be said that none of them combines all of the recited advantages and avoids all the disadvantages.

However, in order to secure the full advantage and efficiency of a facsimile system of the above recited type the manner in which the message carrier both for scanning and for reproducing purposes is employed, is of paramount importance; unless it is very simple to transmit and receive a message without impairing its reliability, the system is not practical. Furthermore, if a method is available to simplify the handling of the message carrying paper, but a system is used that is so complicated that it would create service problems and increase the costs considerably, it is obvious that its use for the instant purpose would be very much limited, if not completely excluded.

As a photoelectric scanning system is preferably used for the purposes of this invention, it might be useful to refer to some of the various methods in use for scanning the paper which carries the message.

Ordinarily a square sheet of paper is wrapped around a cylinder; while the paper carrying cylinder rotates, the scanner moves along a helical track. In the performance of this method, individual sheets of paper must be cut and applied to the cylinder and taken off after use. This is not only a lengthy procedure, but also one that requires considerable skill and attention. Carelessness in applying the paper sheets results in poor transmission and very often renders the message unintelligible.

To eliminate this great drawback a system using a continuous paper supply has been devised, where a paper tape proceeds during the scanning at a slow speed while the scanner is

BEST AVAILABLE COPY moved across the tape by a reciprocating motion at a very rapid speed, in order to scan the paper line by line. This method introducing the reciprocating action of the scanner has a very great disadvantage because due to the mass of the scanner and the inertia of the reciprocating parts an apparatus complying with practical requirements is difficult to be built; besides, a device of this type is limited to comparatively low speeds. It must also be borne in mind that whatever movement is effected by the scanner has to be duplicated by the scriber and the two movements have to be synchronized. Now, it is particularly difficult to synchronize oscillating or reciprocating movements at high speeds and distortion of the messages must result. In spite of the advantages due to the use of a continuous message carrier, the drawbacks of an oscillating scanner are so great that this system has reached only a rather limited practical application.

In facsimile systems not based on photoelectric or contact scanning or prewritten messages a mechanical electrical system is provided with which the scriber is connected at the transmitting end and a corresponding motion is effected at the receiving end of the scriber.

This system requires considerable electrical installation; while it has the advantage of an immediate but slow transmission of the message compared to a slight delay such as in the scanning method, it has the great disadvantage of embodying the writing movement of the sender as well as the fact that the message is transmitted simultaneously with the writing; neither corrections nor rewriting of the message is possible. These complicated systems are exceedingly sensitive to shock and rough handling; they further require careful upkeep of the scribers; furthermore, considering the human element involved in this type of communication, they are only suitable for a certain percentage of users who can adjust their writing to the intelligence level which these systems require; jerky and erratic script cannot be transmitted properly.

The elimination of all of the above recited drawbacks in combination with utmost constructional simplicity, operating reliability and sturdiness of a facsimile system is a main object of this invention.

It is another object of the same to eliminate those difficulties which are caused by the introduction, the straightening and the adjustment of individual message sheets.

In connection therewith it is an object of this invention to render the telescriber usable for unskilled and unattentive operators, without however in the least impairing the accuracy and reliability of the message production.

It is another object of the invention to provide facilities by which the message after being written may be corrected, the writing may be stopped entirely or may be written with any writing implement and any desired speed dependent on the skill and habits of the writer.

It is also an object of the invention to secure a permanent record of the messages written at the transmitting end and delivered to the receiving end.

It is an important object of the invention to provide a facsimile device which is particularly suited for inter-office communication, that is, a communication of prewritten messages from one room to another in the same building or in a nearby building; it is, however, evident that this invention may be used with equal advantage for script communication between more distant places, where it will also compete favorably with existing facsimile systems.

With the above recited and additional objects in view which will become manifest as this specification proceeds, the invention is described in the following and illustrated by the accompanying drawings, as a preferred embodiment, it being understood that modifications, variations and adaptations may be resorted to within the scope, principle and spirit of the invention, as it is more particularly claimed hereinbelow.

Figure 4:
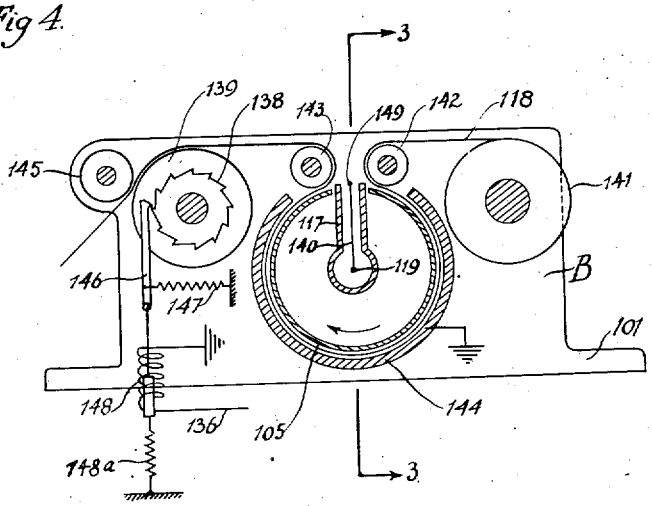
Figure 2:
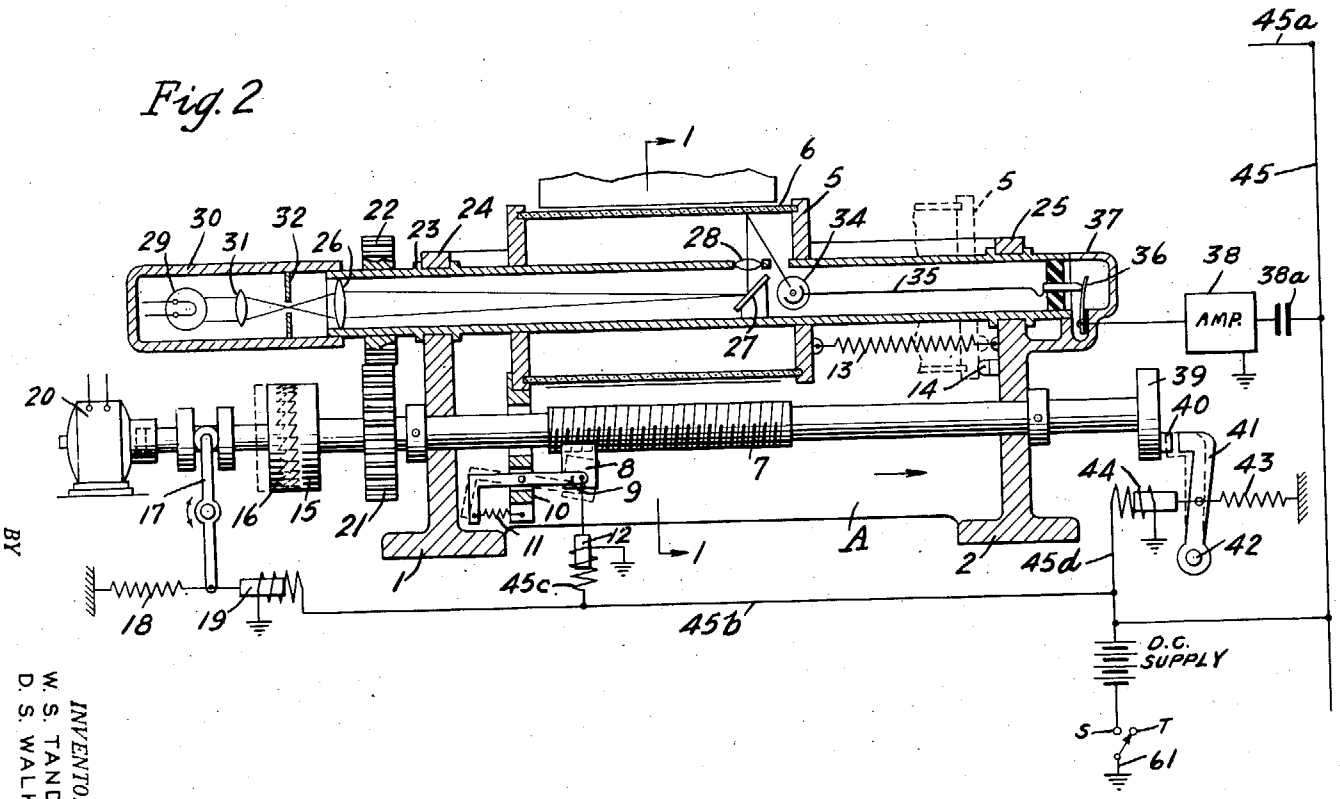
Figure 3:
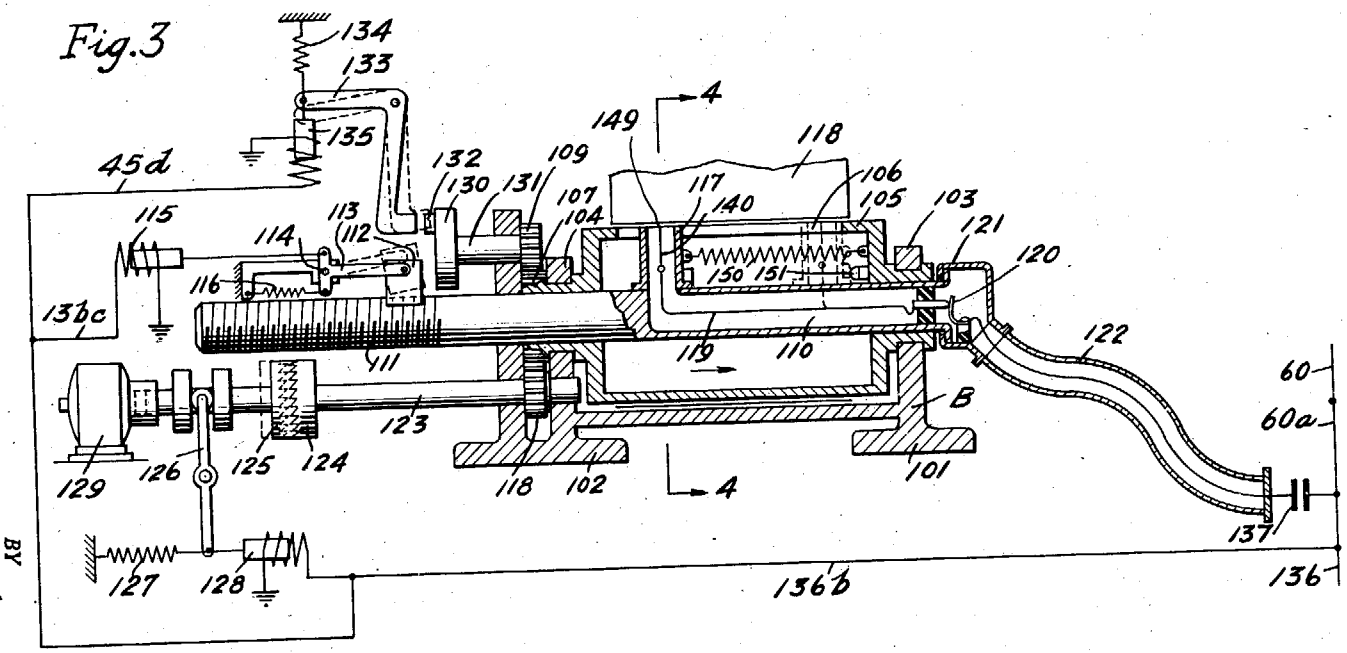

In the drawings,

Figs. 1 and 2 constitute the transmitter,

Fig. 1 being a vertical elevation taken on line 1—1 of Fig. 2, some of the parts of Fig. 2 being for clarity's sake shown in an out-of-center position, Fig. 2 being a vertical longitudinal elevation taken on line 2—2 of Fig. 1, Figs. 3 and 4 constitute the receiver, Fig. 3 being a vertical elevation taken on line 3—3 of Fig. 4, Fig. 4 being a vertical longitudinal elevation taken on line 4—4 of Fig. 3.

In order to simplify and to clarify the illustrative showing of the invention, certain parts more specifically mentioned below are shown in either of the two elevations only.

Furthermore, the term "message" frequently used in the following description and claims is to include any type of script applied to the message carrier, pictorial matter, sketches, drawings, etc.

In Figs. 1 and 2, A denominates a frame structure supported on two stands 1, 2. Guide rods 3, 4 are mounted in this frame; these guide rods are only shown in Fig. 1 and not in Fig. 2. A carriage 5 having a cylindrical center portion 6 is slidably supported upon these guide rods. A worm 7 located in frame A displaces carriage 5 in the longitudinal direction, a half-nut 8 being for this purpose associated with carriage 5 which nut meshes with worm 7.

Half-nut 8 is located on lever 9 which is journaled in bearing 10 suitably mounted on the transmitter frame A and pressed in the position shown in full lines into worm 7 by spring 11. This full line position signifies the transmitting stage, denominated by T at switch 61, whereas S signifies the stand-by or inoperative position; in the latter position the current is closed, as shown in dotted lines, and the solenoid 12 which is connected by leads 45b, 45c to the current supply disengages the nut 8 from the worm.

Worm 7 is connected to dog clutch member 15, which meshes with dog clutch member 16; the latter is of the movable type and actuated by lever 17 which in turn tends to rotate in a clockwise direction under the influence of spring 18; the spring holds clutch 15, 16 in engagement, as shown in full lines, unless solenoid 19 is energized and lever 17 is moved in the counterclockwise direction, disconnecting clutch members 16 and 15, which position is shown in dotted lines.

Clutch member 16 is connected to an electric motor 20 which is maintained in continuous rotation. A gear 21 is mounted on the shaft of worm 7 which meshes with gear 22 mounted on tube 23 of an optical scanning system. Tube 23 rotates in bearings 24 and 25 located in frame A; the optical system consists of a condenser lens 26, a mirror 27 and objective lens 28, all encased by tube 23.

A stationary tubular housing 30 is situated adjacent to tube 23. This housing 30 contains a

BEST AVAILABLE COPY light source 29 which by means of lens 31 and mask 32 projects a light beam into the above referred to optical system; when passing through lenses 26, 28, the light beam concentrates a small light spot on the outside of cylinder 6. This cylinder is made of glass or some other transparent material and is connected with carriage 5. If paper 33 is supported on cylinder 6, light projected onto the cylinder is reflected or dispersed therefrom and the reflected or dispersed light will pass to photocell 34. In scanning the message from the inside and through a transparent drum the problem of light reflection from this transparent drum and resulting distortion offers a serious and difficult problem. The way this problem has been solved in the instant case is as follows:

The light beam of the projector lamp 29 which is placed outside the optical system is reflected by mirror 27 so that it strikes at a substantially right angle against the walls of the transparent cylinder 6. Thus the light beam penetrates without deflection. The light is not reflected in the usual sense onto the cell 34 and under abstract conditions true light reflection would not occur at all; however, dispersed light is reflected from the paper through the cylinder at a sufficient rate; this dispersed light is relatively strong when reflected from a light surface and comparatively weak when reflected from dark surfaces. The difference suffices to actuate the photoelectric cell 34 which is placed inside the drum 6 in close proximity to the mirror 27 and the optical system. It is therefore, characteristic that not direct but indirect reflection or dispersion is an operating principle of the instant scanning system.

It may here be noted that facsimile transmitting systems using a rotational optical scanner positioned inside of a transparent cylinder around which the subject copy is wrapped are known and no claim is presented for this type of equipment as such.

A lead 35 connects the photocell with contact blade 36 which by insulated mounting means is located in housing 37 and connected to amplifier 38. The design of this contact is such that when tube 23 rotates driven by gear train 21, 22 the contact with lead 35 is maintained and impulses received by the photocell from light reflected from paper 33 are carried through contact 36 to amplifier 38.

The amplifier is in turn coupled to line 45 through blocking condenser 38*a* which permits the alternating current signal impulses to pass, but prevents the D. C. control voltage of the solenoids from feeding into the amplifier. The solenoids have a high impedance to the alternating current and are, therefore, not affected by the signal current.

Also mounted on worm 7 is disc 39 to which a catch 40 is attached which can be brought into contact with stop lever 41. This stop lever is pivoted at 42 and is held during the transmitting stage in the inoperative position by spring 43, shown in full lines. If, however, solenoid 44 is actuated to reestablish the stand-by stage S, stop lever 40 is turned in counterclockwise direction and will engage catch 40 of disc 39, thus preventing worm 7 from rotating beyond the point of engagement; this position of the catch is shown in dotted lines.

A paper roll 46 forming a continuous message carrier is mounted in frame A; it holds a sufficient supply of paper 33 which is drawn over rollers 47, 48, 49, cylinder 6 and roller 50 until it is engaged by wheel 51 which in coaction with a roller 52 is capable of drawing the paper off the roll 46 and through the transmitter, so as to form a loose end 53 which may be torn off again or again wound into a roll, to secure a permanent record.

Between roller 47 and 48 a support or pad 54 is provided which supports the paper strip when a message is written or a drawing is made by means of pencil 55 on the portion of the paper strip 33, situated on the support.

Light coming from the light source 29 creates a light spot 62 which is reflected or dispersed from the circumference of the drum 6 onto the photocell 34. Ratchet 56 is rotated by pawl 57 which is actuated by solenoid 58 connected with lead 45*a* and kept in engagement with the ratchet by spring 59. A gearing, not shown, is provided between drum 51 and ratchet 56 by which drum 51 will turn a part or full or more than one revolution, if ratchet 56 is moved one tooth; pawl 57 is actuated by solenoid 58 connected to lead 45*a* and held against ratchet 56 by spring 58*a*.

Figures 3 and 4 show the receiver which by leads 60*a*, 136*b* is connected with lead 60 of the transmitter; a frame B supported on stands 101 and 102 carries by means of bearings 103 and 104 a rotatably mounted drum 105 having slotted wall portion 106. Mounted on drum 105 is gear 107 which meshes with gear 108 below and 109 above. Mounted axially inside the drum is a cored shaft 110 which is rotatable as well as slidable in a longitudinal direction within drum 105. The solid end of shaft 110 is constructed as a worm 111 which during the transmitting stage T, shown in full lines, meshes with half-nut 112; this half-nut is mounted on a lever 113 pivoted at 114 and held in the transmitting position by spring 116, but is capable of being moved out of engagement with worm 111, as shown in dotted lines, by energizing solenoid 115 which is connected by leads 136*c*, 136*b* to the D. C. current source.

Attached to shaft 110 is a short tubular member 117 which with its outer end engages with slot 106 of drum 105 in such a way that when drum 105 is rotated through gear train 107 and 108, shaft 110 is rotated in the same direction by the engagement of member 117 and slot 106. If at this time half-nut 112 is in engagement with worm 111, then cored shaft 110 will have imparted to it a longitudinal movement parallel with the axis of drum 105.

Inside of and insulated from tubular member 117 a fine wire 140 is mounted capable of touching at a point 149 the paper 118 supported on drum 105. This wire serves as a contact and is connected by lead 119 to contact 120 which is mounted inside housing 121 and held by cable 122 so that when hollow shaft 110 and drum 105 are rotated, contact is maintained between lead 119 and contact 120.

Gear 108 is mounted on shaft 123 and on the same shaft is mounted in a fixed position clutch member 124 meshing with clutch member 125; the latter is of the movable type and is actuated by lever 126 in a manner similar to clutch member 17 shown in Fig. 2. A spring 127 maintains the clutch in the transmitting position, shown in full lines; if energized by switch 61, Fig. 2, solenoid 128 connected to lead 136*b* will disconnect the clutch, as shown in dotted lines.

A continuously rotating motor 129 is provided to drive the whole mechanism through the above mentioned clutch 124, 125. Further provided is

BEST AVAILABLE COPY disc 130 mounted on shaft 131 which carries gear 109. On disc 130 is also mounted catch 132; in a manner similar to that described in connection with members 41, 44 of Fig. 2 a lever 133 is provided which is held in a non-operative full line position by spring 134, but may be put into the operative position, shown in dotted lines, if solenoid 135, connected by lead 45d to the D. C. current source, is energized.

Cable 122 is connected through D. C. blocking condenser 137 to leads 136 and 60a, respectively. Lead 60a is connected to lead 60 of the transmitting unit. Lead 136 is connected to a solenoid 148 actuating ratchet 138; ratchet 138 is operated in the same manner as described in connection with members 51, 52, 53, 56, 57, 58, 59 of Fig. 1. Accordingly ratchet 138 is connected by a gear train (not shown) to wheel 139 which pulls a suitable paper 140 of roll 141 forming a continuous message receiver, then over rollers 142, 143 and around drum 105, the paper being held between this drum and a guard 144. Roller 145 presses the paper against wheel 139; a ratchet 138 is mounted on the shaft carrying wheel 139 and a pawl 146 is kept in engagement with ratchet 138 by spring 147; pawl 146 is actuated by solenoid 148 connected to lead 136 and held against ratchet 138 by spring 148a.

The paper roll arrangement 46, 141 forming the continuous message carriers may be substituted by the following device:

An endless conveyor consisting, for instance, of a fabric band, may be provided which is supported on drums substituting paper rolls 46, 141 and wheels 51, 139, suitable guide rollers being arranged to conduct the conveyor around cylinders 6 and 105 and from wheels 51 and 139 to the drums replacing the paper rolls. Removable paper sheets, telegram forms or other implements for the application of messages are placed on the conveyor in such a manner that their safe conduct through the transmitter or receiver set is assured.

The following is the operation of the device:

Paper 33 is unwound from roll 46 in the manner previously described and shown in Figs. 1 and 2. A message is written or a drawing is made on a section of the paper which is supported on writing pad 54. Actuating ratchet 56, by opening switch 61, the portion of the paper band 33 situated between rollers 47 and 48 is drawn into the transmitting apparatus. Simultaneously through common electrical connections 45, 60, 60a and 136, ratchet 138 is actuated and a corresponding piece of paper is drawn around drum 105 in the receiving set shown in Figs. 3 and 4. By putting switch 61 into the T position, synchronous motors 20 and 129 which are constantly rotating at a uniform speed are connected simultaneously by the action of springs 18, 127 and through clutches 16, 125 to shafts 7 and 123, respectively. Thus the two mechanisms operate in synchronism.

The optical system contained in tube 23 rotates and at the same time through half-nut 8 carriage 5 is moved in a longitudinal direction; a light spot 62 projected from light source 29 through the optical system onto the paper 33 will thus describe a helical path inside transparent cylinder 6 and scan the surface of the paper which is wrapped around this cylinder. Wherever the light spot hits the light surface of the paper, a considerable amount of light will be reflected or dispersed and will actuate photocell 34. If, however, light spot 62 falls on dark portions of the paper, such as constituting the message, the reflection will be less and the current flowing through photocell 34 in proportion to the light falling on this photocell will be reduced. This differential in light will correspond to the light and dark portions of the markings on paper 33 and will be transmitted to amplifier 38 and amplified to a sufficient level to cause a scriber, for instance, spark electrode 140 to reproduce the message at point 149 on a special paper 118 in a manner well known in the art.

While shaft 110 is rotated by motor 129 through gear train 108 and 107, it simultaneously rotates a drum 105 because part 117, as previously described, engages with slot 106. At the same time half-nut 112, being released by solenoid 116, engages worm 111; therefore, shaft 110 while being rotated is also moved in a longitudinal direction, thus imparting to point 149 a helical movement corresponding to that of light spot 62 in the transmitter.

The electrical system is arranged in such a manner that whenever a dark spot is marked on paper 33, the impulses created on photocell 34 will induce sufficient alternating current to flow through wire 119 in order to cause a spark to arc over to a specially prepared paper 118 which is thus marked with a black mark in conformity with the original on paper 33. The impulse transmitting method is here based on the use of nitrate coated papers; however, other methods, such as magnetically actuated scribers may be used.

The electrical circuit is so arranged that when the drum 6 of the transmitter or the rotating shaft 110 of the receiver has reached the end of their longitudinal travel, a limit switch, not shown in the drawing, is actuated which will automatically close switch 61, restore the stand-by stage S, energizing the solenoids and thus disengages clutches 16 and 125, respectively, and bring the mechanism to a standstill.

However, it must be kept in mind that there is some inertia left which will carry the rotating movement somewhat beyond the moment of interruption, and as levers 41 and 133 are moved at the same time into operating position by their solenoids, they will engage with catch 40 and 132, respectively, and stop the rotating movement at a predetermined and definite stopping or starting point respectively. Simultaneously, solenoids 12 and 116 will be energized and disengage half-nut 8 from shaft 7 and half-nut 112 from shaft 111. This will cause spring 13 to pull carriage 5 into a direction indicated by the arrow and cause it to hit against stop 14, where it will come to rest, as indicated by the dotted line portion. Similarly, spring 150 will pull shaft 110 in the direction of the arrow until it is stopped by stop 151 and comes to rest in a definite and predetermined position, thus resetting the mechanism to its initial starting position.

The message or drawing transmitted from the transmitter paper 33 to the receiver paper 118 can then be taken out of the apparatus by actuating ratchet 138 by manual controls not shown in the drawing. However, the messages may also be left in the device to be discharged when the next message is received.

While in the above description a photoelectric system has been indicated to carry this invention into effect, it will be apparent to one skilled in the art that this invention is by no means limited to this particular system shown and described, but that many modifications may be made with-

BEST AVAILABLE COP' out departing from the scope of this invention as set forth in the appended claims.

We claim:

1. In a machine for facsimile systems, a stationary frame having a pair of uprights, a cylindrical support movably mounted between said uprights, means on said frame for supporting a paper supply roll at one side of said cylindrical support, paper feed mechanism mounted on said frame at the other side of said support, said mechanism including a rotary member, a pair of closely spaced rollers mounted between said uprights to guide a continuous sheet of paper from said supply roll around the outer surface of said cylindrical support and into engagement with said rotary member, an electric actuating device connected to said rotary member in such driving ratio that the energized device rotates said member a predetermined amount to draw a measured length of paper from the supply roll around said cylindrical support, said closely spaced rollers holding the measured length of paper against the outer surface of said cylindrical support which thereby automatically shapes the paper into cylindrical form for inside scanning, a rotary hollow shaft supported by said uprights and passing centrally through said cylindrical support, a scanner arranged to operate through said hollow shaft on the inside surface of a sheet mounted on the outside of said cylindrical support, and means for producing relative axial displacement of said scanner and the supported sheet during a scanning operation.

2. In a facsimile system a transmitter comprising a paper band roll forming a continuous message carrier, a transparent cylinder to support the message containing portion of said paper band, means to transport said message onto the circumference of said cylinder, a pad located underneath the said paper band over a predetermined length thereof, a stationary light source, a photoelectric scanner rotatably supported in said cylinder, means to displace said cylinder substantially perpendicular to the transport direction of said paper band in order to effect helical inside scanning of the same, and means to transmit the energy impulses of said scanner to a receiver.

3. In a facsimile system a transmitter comprising a paper band roll forming a continuous message carrier, a transparent cylinder to support the message containing portion of said paper band, means to transport said message onto the circumference of said transparent cylinder, a pad located underneath the said paper band having a length approximately equal to one half of the circumference of said cylinder, a light source, a photoelectric scanner rotatably supported in said cylinder, means to displace said cylinder substantially perpendicular to the transport direction of said paper band in order to effect helical inside scanning of the same, and means to transmit the energy impulses of said scanner to a receiver.

4. In a facsimile system a transmitter comprising a continuous message carrier, a transparent cylinder to support said message carrier, means to transport said message carrier onto the circumference of said cylinder, a photoelectric scanner unit including a housing rotatably supported coaxially in said cylinder, a second housing open at one end and projecting therewith over the one end of said first housing, a light source and a light mask in said latter housing, an objective lens and a light reflector in said first housing to direct light through said lens substantially at an angle of 90° onto said transparent cylinder, a photocell adjacent to said reflector to receive the light dispersed from said message carrier, means to displace said scanner in a longitudinal direction substantially perpendicular to the transport direction of said continuous message carrier in order to effect helical inside scanning of the message on said continuous carrier, and means to transmit the energy impulses of the said scanner to a receiver.

5. In a facsimile system a transmitter comprising a continuous message carrier, a transparent cylinder to support said message carrier, means to transport said message carrier onto the circumference of said cylinder, a photoelectric scanner unit including a tubular member rotatably supported coaxially in said cylinder, a second tubular member open at one end and loosely projecting therewith over the one end of said first tubular member, a light source and a light mask in said second tubular member, an objective lens in the wall of said member and a light reflector in the center of said first tubular member to direct light through said lens substantially at an angle of 90° onto said transparent cylinder, a photocell adjacent to said reflector to receive the light dispersed from said message carrier, means to displace said scanner in a longitudinal direction substantially perpendicular to the transport direction of said continuous message carrier in order to effect helical inside scanning of the message on said continuous carrier, and means to transmit the energy impulses of said scanner to a receiver including a current lead in said first rotatable tubular member connected with said photocell and a stationary blade contact contacting said lead during the rotation of said scanner to transmit the energy impulses of the scanner.

6. In a facsimile transmitter, a frame having a continuous message carrier mounted thereon, said message carrier comprising a paper band supply roll, a pad on said frame arranged to support a portion of the band for writing copy thereon, means on said frame for supporting a copy-bearing portion of said paper band in the form of a cylindrical sheet, scanning means for the inside surface of said cylindrical copy sheet, and means for axially displacing said sheet and scanning means relatively to each other.

7. In a transmitter for facsimile systems a continuous message carrier, a transparent cylinder to support the message carrier, means to feed the message carrier onto the outside of said transparent cylinder, a scanner rotatably located in said transparent cylinder, means to displace the cylinder in the direction of its longitudinal center axis substantially perpendicular to the transport direction of said continuous message carrier, in order to effect helical inside scanning of the message on said continuous message carrier, continuously operated driving means to synchronously effect the rotation of said scanner and the longitudinal displacement of said transparent cylinder, means to simultaneously initiate the said two movements, means to simultaneously and automatically disconnect said driving means upon a predetermined completion of said longitudinal displacement, means to restore the initial operating position of the transmitter and means adapted to transmit the energy impulses of the scanner to a receiver.

8. In a transmitter for facsimile systems a continuous message carrier, a transparent cylinder to support the message carrier, means to feed the message carrier onto the outside of said transparent cylinder, a scanner rotatably located in said

BEST AVAILABLE COPY transparent cylinder, means to displace the cylinder in the direction of its longitudinal center axis substantially perpendicular to the transport direction of said continuous message carrier in order to effect helical inside scanning of the message on said continuous message carrier, a D. C. current supply, continuously operated motors to synchronously effect the rotation of said scanner and the longitudinal displacement of said transparent cylinder, means to simultaneously initiate the said two movements, means to simultaneously and automatically disconnect said driving means upon a predetermined completion of the longitudinal displacement, means to restore the initial operating position of the transmitter, means automatically operative at the interruption of the rotative movement of the scanner to consume the residual inertia inherent in the rotating parts and means adapted to transmit the energy impulses of the scanner to a receiver.

WILLIAM S. TANDLER.
DAVID S. WALKER.

REFERENCES CITED

The following references are of record in the file of this patent:

UNITED STATES PATENTS

| Number | Name | Date |
|---|---|---|
| 1,746,407 | Schroter et al. | Feb. 11, 1930 |
| 2,394,649 | Young | Feb. 12, 1946 |